United States Patent [19]

Kohlmeier et al.

[11] Patent Number: 5,421,564
[45] Date of Patent: Jun. 6, 1995

[54] VIBRATION DAMPER FOR A VEHICLE WHEEL SHOCK ABSORBER STRUT

[75] Inventors: Hans-Heinrich Kohlmeier, Munsheim; Peter Baumann, Muhlacker; Heinz Bayer, Ulm, all of Germany

[73] Assignee: Dr. Ing., h.c.f. Porsche AG, Weissach, Germany

[21] Appl. No.: 942,176

[22] Filed: Sep. 9, 1992

[30] Foreign Application Priority Data

Sep. 9, 1991 [DE] Germany .................. 41 29 797.0

[51] Int. Cl.6 .................. B60G 15/00; F16F 9/54
[52] U.S. Cl. .................. 267/220; 267/293; 267/140.4
[58] Field of Search .............. 267/35, 64.15, 64.25, 267/219, 220, 293, 140.13, 140.4; 280/668, 671, 692, 710

[56] References Cited

U.S. PATENT DOCUMENTS

| 4,592,540 | 6/1986 | Yokoya et al. | 267/35 |
| 4,773,635 | 9/1988 | Buma | 267/220 |
| 4,971,296 | 11/1990 | Kondo | 280/668 |
| 5,078,370 | 1/1992 | McClellan | 280/668 |

FOREIGN PATENT DOCUMENTS

| 2535259 | 5/1984 | France . |
| 3913528 | 11/1989 | Germany . |
| 4127616 | 11/1992 | Germany . |
| 62-41435 | 2/1987 | Japan . |
| 2068212 | 3/1990 | Japan . |
| WO8905242 | 6/1989 | WIPO . |

OTHER PUBLICATIONS

European Search Report for European Patent Application No. EP 92 11 4169, Nov. 11, 1992.
English version of the European Search Report.

*Primary Examiner*—Robert J. Oberleitner
*Assistant Examiner*—Chris Schwartz
*Attorney, Agent, or Firm*—Evenson, McKeown, Edwards & Lenahan

[57] ABSTRACT

A vibration damper for a shock absorber strut is described which is arranged on a piston rod above the elastic body-side bearing facing away from the vehicle wheel. The damper comprises a mass element which is connected with a carrier plate, in which case the element is fastened on a centric pot element by way of radially extending elastic arms, the pot element being held on the free end of the piston rod above the elastic bearing.

17 Claims, 2 Drawing Sheets

VIBRATION DAMPER FOR A VEHICLE WHEEL SHOCK ABSORBER STRUT

BACKGROUND AND SUMMARY OF THE INVENTION

This invention relates to a vibration damper for a shock absorber strut which in use is arranged on a piston rod above an elastic body side bearing facing a vehicle wheel.

In the case of motor vehicles, particularly vehicles constructed as convertibles, more vibrations occur because of the more pronounced softness of the vehicle body than in the case of vehicles constructed as coupes; or vibrations may be transmitted as a result of excitations, for example, by way of the wheel and the shock absorber strut, into the vehicle body which impairs the driving comfort considerably.

It is an object of the invention to provide a vibration damper which can be connected as a kit with the shock absorber strut in a constructively simple manner and which has the purpose of damping a portion of the vibration which enters the vehicle body by way of the piston rod and causes a trembling.

According to the invention, this object is achieved by providing an arrangement comprising:

a carrier plate, a mass element which is connected with the carrier plate, and a centric pot element which is held on the free end of the piston rod above the elastic body-side bearing by way of radially extending elastic arms.

The principal advantages achieved by means of the invention are that the vibrations are damped which cause the trembling of the vehicle body and are introduced into the vehicle body by way of the piston rod, by means of a simply constructed damper. In particular, this takes place by means of a mass element which is connected with the piston rod by way of several elastic arms. This elasticity permits a reduced relative movement of the piston rod because of the mass element which, by way of a pot, is fastened directly on the elastic bearing of the shock absorber strut on the vehicle body.

On the pot element, in certain preferred embodiments, an axial pressure stop is provided for the shock absorber strut as well as an axial guiding device with a tension stop. As a result, the compression and rebounding movement of the shock absorber strut is limited, on the one hand, and, on the other hand, the damper is restrictedly guided in the axial direction in order to avoid uncontrolled axial movements because of the elastic arms.

The carrier plate is designed in certain preferred embodiments such that the elastic arms as well as a sleeve-shaped receiving device for the pot element are vulcanized on, and the metallic received device and the carrier plate are vulcanized into rubber.

According to certain preferred embodiments, the elastic arms of the damper are surrounded by the carrier plate; that is, the arms are arranged in corresponding cutouts of the plate. The mass element in turn, is detachably connected with the plate by way of screws. Projections of the mass element project in each case between two elastic arms so that a one-piece mass element is obtained which is closed in itself and is adapted to the circumferential shape of the carrier plate.

In particular preferred embodiments, it is provided that the mass element is made of lead and with considerable masses is arranged above the carrier plate, and punctiform mass accumulations extend into the plane of the bottom of the pot element. The center of gravity of the mass is situated in the longitudinal axis of the piston rod.

By means of the construction of the damper according to the invention, it becomes possible to arrange this damper in a simple manner above the elastic bearing of the shock absorber strut on the vehicle body in order to dampen vibrations of the vehicle body which are introduced by way of the piston rod.

Other objects, advantages and novel features of the present invention will become apparent from the following detailed description of the invention when considered in conjunction with the accompanying drawings.

DETAILED DESCRIPTION OF THE DRAWINGS

Figure 1:
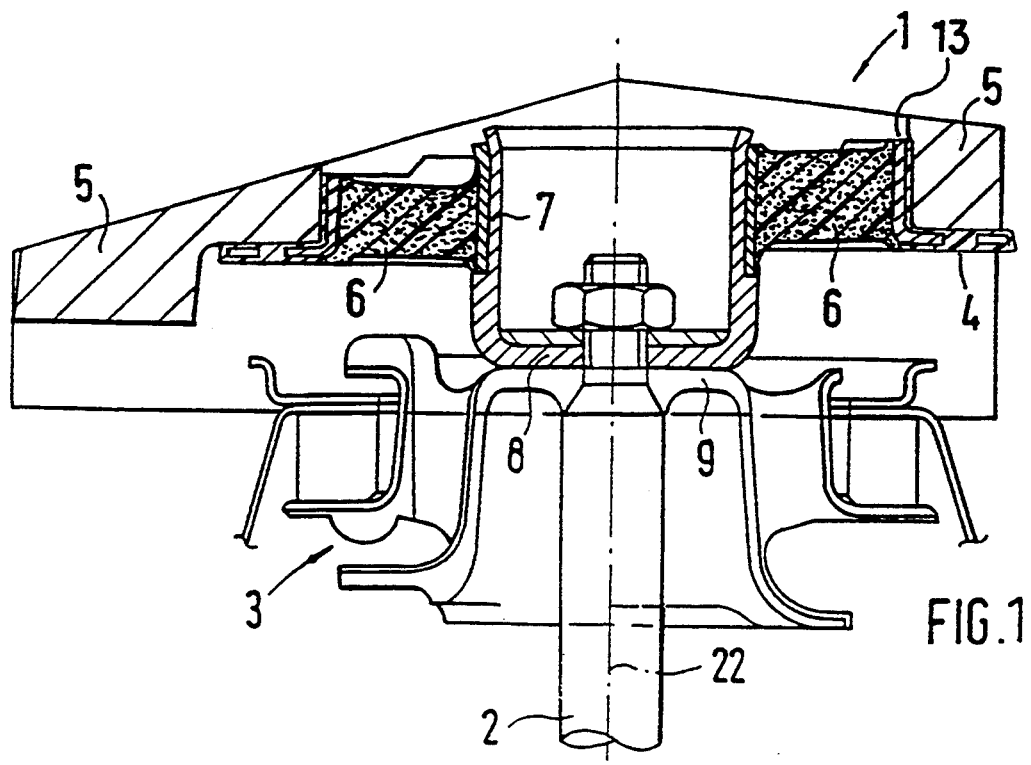
FIG. 1 is a sectional view taken along Line I—I of FIG. 3 of a vibration damper connected with a piston rod, constructed according to a preferred embodiment of the invention.
Figure 2:
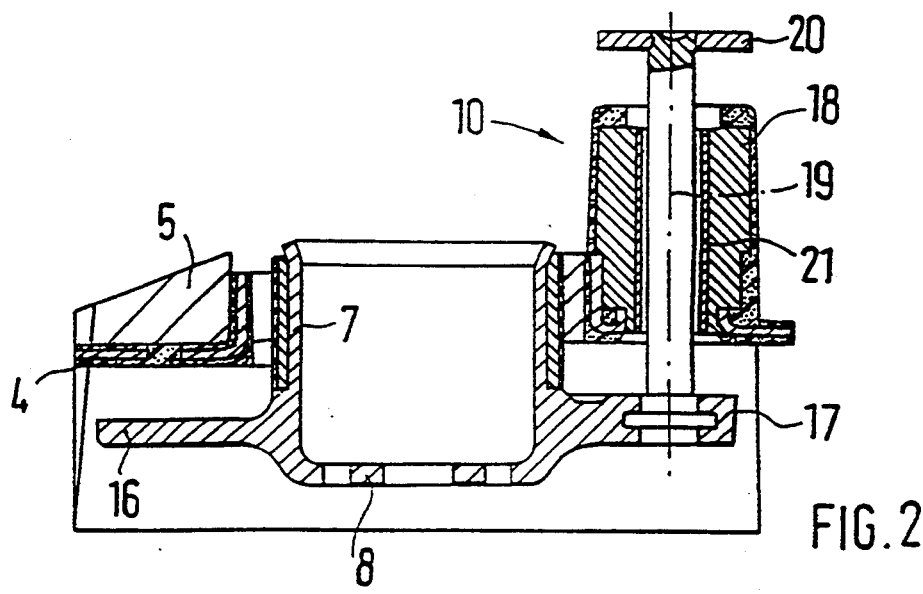
FIG. 2 is a sectional view taken along Line II—II of FIG. 3.
Figure 3:
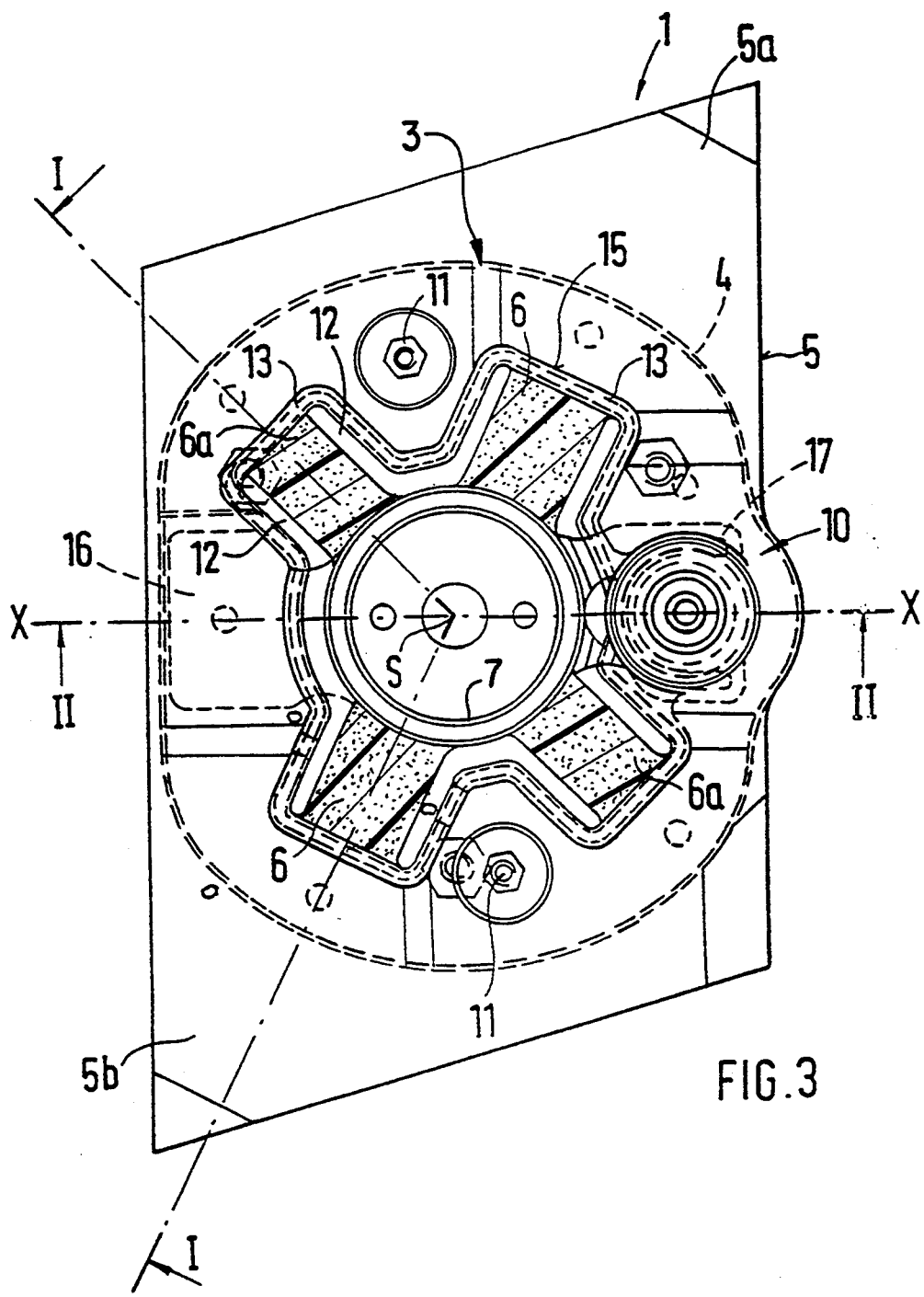
FIG. 3 is a top view of the vibration damper of FIGS. 1 and 2.

A vibration damper 1 is shown for a shock absorber strut, of which strut only a piston rod 2 and an upper elastic bearing 3 for the support on the vehicle body are illustrated. Vibration damper 3 essentially comprises a mass element 5 which is connected with a carrier plate 4. By way of several elastic arms 6, 6a, this mass element 5 is fastened to the free upper end of the piston rod 2 by means of a pot element 7. By means of its bottom 8, the pot element 7 is supported against an interior bearing shell 9 of the elastic shock absorber strut bearing 3. A guiding device 10 is connected with the pot element 7 for guidably supporting same at a vehicle.

The mass element 5 is detachably connected with the carrier plate 4 by way of screws 11 permitting a simple exchange or demounting for the purpose of an environmentally sound processing.

The pot element 7 fastened to the piston rod 2 is connected with the elastic arms 6, 6a which, in turn, are part of the carrier plate 4 so that the piston rod 2 can move elastically with respect to the mass element 5.

The carrier plate 4 has cutouts 12 which are arranged in a star-shaped manner, are bounded by U-shaped webs 13 arranged in a horizontal plane and in which the elastic arms 6, 6a are movably arranged with respective lateral clearances.

Two elastic arms 6 respectively are arranged diametrically opposite one another and form a so-called cross with the other elastic arms 6a. The adjacent arms 6 and 6a are arranged approximately at an angle of from 40°–45° with respect to one another.

The U-shaped webs 13 of the carrier plate 4 project into correspondingly shaped corresponding recesses 15 of the mass element 5 so that an element 5 is obtained that is adapted to the circumferential shape of the carrier plate 4. With a part of its mass, this element 5 is arranged above the carrier plate 4, and mass accumulations 5a and 5b extend to approximately into the plane of the bottom 8 of the pot element 7.

Approximately in the plane of its bottom 8, this pot element 7 has diametrically opposite metallic arms 16, 17 which extend radially in a horizontal plane and are used as a stop for the shock absorber strut as well as for the damper 1.

The guiding device 10 is connected with one of these arms 16 or 17. This guiding device 10 comprises a pin 19 which is axially guided in a mass projection 18 and which has a stop plate 20 on the end face which can strike against the mass projection 18. The pin is preferably guided in a plastic sleeve 21.

The mass element 5 is made of a metal of a high specific weight, such as lead, in which case masses are provided which are of approximately the same weight, with respect to a perpendicular plane X—X which extends through the longitudinal axis 22 of the piston rod 2. The mass of the element 5 has a center of gravity S which is situated in the longitudinal axis 22 of the piston rod.

The damper mass 5 is preferably held by way of at least four elastic arms 6 and 6a, in which case the metallic arms 16 and 17 of the pot element 7 are each arranged between the elastic arms 6 and 6a, and the carrier plate 4 is disposed directly opposite them.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A vibration damper arrangement for a shock absorber strut arranged on a piston rod above an elastic body-side bearing facing away from a vehicle wheel, said vibration damper arrangement comprising:
   a carrier plate,
   a mass element which is connected with the carrier plate, and
   a centric pot element which is held on the free end of the piston rod above the elastic body-side bearing by way of radially extending elastic arms,
   wherein the carrier plate surrounds the pot element, wherein the elastic arms extend in a star-shaped manner into corresponding cutouts of U-shaped webs of the carrier plate, and wherein the mass element is supported on the carrier plate and is detachably connected with it by the way of screws.

2. A vibration damper according to claim 1, wherein the pot element comprises diametrically opposite metallic arms which form stops of the elastic body side bearing of the shock absorber strut and wherein at least one of said arms is connected with a guiding device.

3. A vibration damper according to claim 2, wherein the guiding device has a perpendicularly aligned pin which is connected with one of said arms, said pin being guided in a projection sleeve formed at the mass element and having a stop plate on the end face of said pin.

4. A vibration damper according to claim 3, wherein a plastic bush for the slidable receiving of the pin is arranged in the sleeve.

5. A vibration damper according to claim 1, wherein the mass element has a center of gravity which is situated in the longitudinal axis of the piston rod.

6. A vibration damper according to claim 5, wherein the pot element comprises diametrically opposite metallic arms which form stops of the elastic bearing of the shock absorber strut and wherein at least one of said arms is connected with a guiding device.

7. A vibration damper according to claim 1 wherein the mass element is adapted to the circumferential shape of the carrier plate, and wherein the U-shaped webs of the carrier plate are arranged in corresponding recesses of the mass element.

8. A vibration damper according to claim 7, wherein the carrier plate has a metallic construction and its surfaces are provided with rubber which is formed in one piece with the elastic arms.

9. A vibration damper according to claim 1, wherein the carrier plate has a metallic construction and its surfaces are provided with rubber which is formed in one piece with the elastic arms.

10. A vibration damper according to claim 9, wherein the mass element is adapted to the circumferential shape of the carrier plate, and wherein the U-shaped webs of the carrier plate are arranged in corresponding recesses of the mass element.

11. A vibration damper arrangement for a shock absorber strut arranged on a piston rod above an elastic body-side bearing facing away from a vehicle wheel, said vibration damper arrangement comprising:
    a carrier plate,
    a mass element which is connected with the carrier plate, and
    a centric pot element which is held on the free end of the piston rod above the elastic body-side bearing by way of radially extending elastic arms,
    wherein the mass element has a center of gravity which is situated in the longitudinal axis of the piston rod,
    wherein the pot element comprises diametrically opposite metallic arms which form stops of the elastic bearing of the shock absorber strut and wherein at least one of said arms is connected with a guiding device, and
    wherein the carrier plate surrounds the pot element, wherein the elastic arms extend in a star-shaped manner into corresponding cutouts of U-shaped webs of the carrier plate, and wherein the mass element is supported on the carrier plate and is detachably connected with it by way of screws.

12. A vibration damper according to claim 11, wherein the mass element is adapted to the circumferential shape of the carrier plate, and wherein the U-shaped webs of the carrier plate are arranged in corresponding recesses of the mass element.

13. A vibration damper arrangement for a shock absorber strut arranged on a piston rod above an elastic body-side bearing facing away from a vehicle wheel, said vibration damper arrangement comprising:
    a carrier plate,
    a mass element which is connected with the carrier plate, and
    a centric pot element which is held on the free end of the piston rod above the elastic body-side bearing by way of radially extending elastic arms,
    wherein the mass element has a center of gravity which is situated in the longitudinal axis of the piston rod,
    wherein the pot element comprises diametrically opposite metallic arms which form stops of the elastic bearing of the shock absorber strut and wherein at least one of said arms is connected with a guiding device, and wherein the mass element consists of lead and is arranged above the carrier plate and extends partially with its mass accumulation along the circumference of the plate to the level of the bottom of the pot element.

14. A vibration damper according to claim 13, wherein at least four of said elastic arms are provided, two elastic arms respectively being diametrically opposite one another, adjacent elastic arms being arranged at an angle of approximately to 40° to 45° with respect to one another, and wherein the metallic arms of the pot element are arranged between respective pairs of the elastic arms and are disposed directly opposite the carrier plate.

15. A vibration damper arrangement for a shock absorber strut arranged on a piston rod above an elastic body-side bearing facing away from a vehicle wheel, said vibration damper arrangement comprising:
a carrier plate,
a mass element which is connected with the carrier plate, and
a centric pot element which is held on the free end of the piston rod above the elastic body-side bearing by way of radially extending elastic arms,
wherein the pot element comprises diametrically opposite metallic arms which form stops of the elastic body side bearing of the shock absorber strut and wherein at least one of said arms is connected with a guiding device, and
wherein at least four of said elastic arms are provided, two elastic arms respectively being diametrically opposite one another, adjacent elastic arms being arranged at an angle of approximately to 40° to 45° with respect to one another, and wherein the metallic arms of the pot element are arranged between respective pairs of the said elastic arms and are disposed directly opposite the carrier plate.

16. A vibration damper arrangement for a shock absorber strut arranged on a piston rod above an elastic body-side bearing facing away from a vehicle wheel, said vibration damper arrangement comprising:
a carrier plate,
a mass element which is connected with the carrier plate, and
a centric pot element which is held on the free end of the piston rod above the elastic body-side bearing by way of radially extending elastic arms,
wherein the mass element has a center of gravity which is situated in the longitudinal axis of the piston rod,
wherein the pot element comprises diametrically opposite metallic arms which form stops of the elastic bearing of the shock absorber strut and wherein at least one of said arms is connected with a guiding device, and
wherein the carrier plate has a metallic construction and its surfaces are provided with rubber which is formed in one piece with the elastic arms.

17. A vibration damper arrangement for a shock absorber strut arranged on a piston rod above an elastic body-side bearing facing away from a vehicle wheel, said vibration damper arrangement comprising:
a carrier plate,
a mass element which is connected with the carrier plate, and
a centric pot element which is held on the free end of the piston rod above the elastic body-side bearing by way of radially extending elastic arms,
wherein the mass element has a center of gravity which is situated in the longitudinal axis of the piston rod,
wherein the pot element comprises diametrically opposite metallic arms which form stops of the elastic bearing of the shock absorber strut and wherein at least one of said arms is connected with a guiding device, and
wherein at least four of said elastic arms are provided, two elastic arms respectively being diametrically opposite one another, adjacent elastic arms being arranged at an angle of approximately to 40° to 45° with respect to one another, and wherein the metallic arms of the pot element are arranged between respective pairs of the elastic arms and are disposed directly opposite the carrier plate.

* * * * *